US008785345B2

(12) United States Patent
Liang et al.

(10) Patent No.: US 8,785,345 B2
(45) Date of Patent: Jul. 22, 2014

(54) METHOD FOR PREPARING HYDROREFINING CATALYST

(75) Inventors: Shunqin Liang, Gansu Province (CN);
Wei Xie, Gansu Province (CN);
Zongbao Wang, Gansu Province (CN);
Huifeng Xue, Gansu Province (CM);
Guangbi Gong, Gansu Province (CN);
Tinghai Wang, Gansu Province (CN);
Jie Wu, Gansu Province (CN); Limin Sun, Gansu Province (CN); Hongmin Kang, Gansu Province (CN); Dehua Huang, Gansu Province (CN); Shufeng Wang, Gansu Province (CN); Yundi Zheng, Gansu Province (CN); Cailan Jiang, Gansu Province (CN); Longgang Lv, Gansu Province (CN)

(73) Assignee: Petrochina Company Limited, Beijing (CN)

( * ) Notice: Subject to any disclaimer, the term of this patent is extended or adjusted under 35 U.S.C. 154(b) by 0 days.

(21) Appl. No.: 13/594,659

(22) Filed: Aug. 24, 2012

(65) Prior Publication Data
US 2013/0225400 A1     Aug. 29, 2013

Related U.S. Application Data

(63) Continuation of application No. PCT/CN2010/000418, filed on Mar. 31, 2010.

(51) Int. Cl.
*B01J 23/00* (2006.01)
(52) U.S. Cl.
USPC .......................... 502/321; 502/325
(58) Field of Classification Search
USPC .................... 502/255, 300–355
See application file for complete search history.

(56) References Cited

U.S. PATENT DOCUMENTS

| 4,409,131 | A | * | 10/1983 | Fetchin | 502/263 |
| 4,483,942 | A | * | 11/1984 | Sekido et al. | 502/255 |
| 4,530,911 | A | | 7/1985 | Ryan et al. | |
| 5,200,381 | A | * | 4/1993 | Kamo | 502/170 |
| 5,565,091 | A | * | 10/1996 | Iino et al. | 208/216 R |
| 6,013,598 | A | * | 1/2000 | Lapinski et al. | 502/305 |
| 6,200,927 | B1 | * | 3/2001 | Shukis et al. | 502/355 |
| 2007/0135300 | A1 | * | 6/2007 | Kagami et al. | 502/208 |
| 2010/0206775 | A1 | * | 8/2010 | Beeckman et al. | 208/134 |

FOREIGN PATENT DOCUMENTS

| CN | 1072616 | 6/1993 |
| CN | 1123310 | 5/1996 |
| CN | 1353168 | 6/2002 |
| CN | 1657597 | 8/2005 |

OTHER PUBLICATIONS

International Search Report and Written Opinion of the International Searching Authority re PCT/CN2010/000418, Dec. 2, 2010.

* cited by examiner

*Primary Examiner* — Anthony J Zimmer
(74) *Attorney, Agent, or Firm* — Brinks Gilson & Lione

(57) ABSTRACT

A method for preparing hydrorefining catalyst comprises the following steps: (1) mixing an aqueous ammonia solution with a polyamine complexing agent to form a mixed solvent; (2) adding a cobalt salt to the mixed solvent, dissolving the cobalt salt, and then adding a molybdenum salt and optional salts of other active components, and dissolving them to prepare an impregnating solution; and (3) impregnating a support with the impregnating solution, followed by aging, drying, and activating the impregnated support to form a hydrorefining catalyst. The hydrorefining catalyst prepared by this method has good activity, selectivity and stability in use.

8 Claims, 2 Drawing Sheets

METHOD FOR PREPARING HYDROREFINING CATALYST

CROSS-REFERENCE TO RELATED APPLICATIONS

The present application is a continuation of PCT/CN2010/000418, filed on Mar. 31, 2010, which claims priority to Chinese Patent Application No. 201010114295.7, filed on Feb. 25, 2010. The contents of these applications are incorporated herein by reference in their entirety.

FIELD

The present invention relates to a method for preparing a hydrorefining catalyst, the catalyst thus prepared is suitable for hydrorefining medium-low distillate oils.

BACKGROUND

Currently, there were many reports about methods for preparing hydrorefining catalysts with Ni—Mo, Co—Mo, Ni—W, Co—W, Co—Mo—Ni, and W—Mo—Ni as active components. In the process of preparing the catalysts containing cobalt and molybdenum by impregnation method, a main problem that exists is that the active components Co and Mo are difficult to be dissolved, and especially two active components are difficult to be dissolved in one solvent. Further, in preparation of the catalysts by using a multi-step impregnation method, the preparation cost of the catalysts is increased. In preparation of the catalysts by using a one-step impregnation method, problems that exist in the prior art are as follows: an organic acid/base needs to be added to promote dissolution of the active components; when the contents of the active components are required to be high, a large amount of organic acid/base needs to be used; during calcination, the temperature is difficult to be controlled, and temperature runaway easily occurs, a large amount of gas is discharged, and loss of catalyst is serious.

Further, whether the formulated impregnation solution of active components is clear and homogeneous directly influences the dispersion degree of the active components in the catalyst after impregnation, thereby influencing the catalyst activity and selectivity. Therefore, selection of effective solvent and dissolution method is a key factor for formulation of the impregnation solution.

U.S. Pat. No. 4,409,131 discloses a method for preparing a CoMo/NiMo catalyst by impregnating a support in a solution containing active components and aqueous ammonia in one step. A process for formulating the impregnation solution is introduced in detail, in which it is required to heat a mixture to promote dissolution of the active components.

U.S. Pat. No. 6,013,598 discloses a method for preparing the catalysts for selective hydrodesulfurization. The catalyst includes cobalt, molybdenum as active components and alumina as a support, and is prepared by isometric impregnating the support in an aqueous solution of the active components with citric acid added, and the maximum content of molybdenum oxide in the resulting catalyst is merely 10 wt %.

CN91110935.8 discloses a method for preparing a hydrorefining catalyst, which includes dissolving cobalt acetate in water, adding ethylenediamine to form a mixed solution of cobalt ethylenediamine, adding ammonium molybdate to the solution at pH 12 to 14, to prepare a co-impregnation solution containing cobalt and molybdenum metals, and impregnating a porous support with the co-impregnation solution, so as to prepare the catalyst. This method has the disadvantage that calcination needs to be carried out in an oxygen-free or trace oxygen atmosphere, in order to obtain the catalyst product.

CN94114194.2 discloses a method for preparing a catalyst with zinc oxide-modified γ-alumina as a support and with cobalt and molybdenum as active components. The method includes: to a certain amount of aqueous ammonia with a concentration of 15% to 28%, adding a desired amount of a cobalt salt, and adding a certain amount of ethylenediamine under continuous stirring, till the amount of ethylenediamine was 1/50 to 1/7 based on the weight of the cobalt salt; and then adding a desired amount of ammonium molybdate under continuous stirring, to prepare a Co—Mo co-impregnation solution; impregnating the preparative support in the co-impregnation solution in one step for 1 to 10 hours, drying for 2 to 6 hours at 110° C. to 150° C., calcinating for 3 to 8 hours at 480° C. to 600° C., to prepare the catalyst, which preferably includes 1 wt % to 5 wt % CoO, 8 wt % to 14 wt % MoO, 1 wt % to 15 wt % ZnO, and the remaining being γ-$Al_2O_3$.

CN00130284.1 discloses a hydrorefining catalyst and method for preparing the same. The catalyst is prepared by impregnating an alumina support with a polymer and a Group IVB metal added, with a co-impregnation solution of ammonia containing molybdenum, cobalt, and nickel as active components. No detailed description of the process for formulating the impregnation solution is provided.

Currently, it is a well-known technology to use aqueous ammonia as a solvent to dissolve Co and Mo active components; however, the effect of aqueous ammonia to increase the dispersion degree of active components is not significant. It is still a challenge how to formulate a clear and stable impregnation solution containing the active components with a low surface tension and low viscosity in a simple way, where the requirement of one-step isometric impregnation of multiple components needs to be met, and after impregnation, the active components needs to keep a high dispersion state. For direct dissolution of a cobalt salt in water or aqueous ammonia without heating, if the amount of solvent is controlled, the cobalt salt tends not to be completely dissolved, and an additional organic acid or base needs to be added to accelerate dissolution of cobalt.

Because pyrolysis gasoline after two-stage hydrogenation is generally used as the raw material for aromatics extraction, the catalyst is required to have an excellent hydrogenation activity (bromine number of product of lower than 1.0 g $Br_2$/100 g) and desulfurization activity (sulfur in product of lower than 1.0 μg/g), is also required to have a favorable selectivity for hydrogenation (avoiding loss in aromatic hydrogenation) and a favorable long-term operational performance. The catalysts for pyrolysis gasoline two-stage hydrogenation in current industrial units have a good hydrogenation activity and desulfurization activity, but suffered from insufficiency long-term operation capability, high loss rate in aromatic hydrogenation (above 2%), low high-load operation capability, and high production cost of catalyst, which influence the economic benefit of the unit.

The above problems are caused by the following main reasons:

(1) Due to poor dispersion of the active metal components on the catalyst, over-potent active center sites exist, resulting in high loss rate in aromatic hydrogenation, especially in benzene hydrogenation;

(2) Since a certain amount of B-acid centers exist on the catalyst, while the amount of strong L-acid centers of L-acids is high, the catalyst is easily coked at a high temperature, so that bed pressure drop is increased, circulation of hydrogen is influenced, hydrogen compressor cannot work, and unqualified hydrogenated products is produced, resulting in shutdown and reproduction;

(3) The specific surface and pore volume, especially the pore size distribution of the catalyst has great influence on the catalyst activity, so a suitable specific surface area, pore volume and pore size centralized in distribution are very important for mass transfer, heat transfer and diffusion;

(4) In order to improve the catalyst activity, the content of the active components may be increased, but a problem of poor dispersion occurs. In view of this problem, multi-step impregnation may be used in the preparation process of the catalyst, that is, after one-step impregnation, drying and calcination are performed, and then next impregnation is performed. As a result, the preparation process is complex, and waste of energy is serious, resulting in increased production cost of the catalyst.

Although one-step impregnation in which a complexing agent such as an organic acid, ammonia, or ethylenediamine is added in the formulation of the impregnation solution has been reported, addition of a large amount of macromolecular organic acid or base may make the subsequent calcination more difficult; and moreover, due to high volatility of ammonia, addition of ammonia may make the formulation of the impregnation solution more difficult, while the dispersion degree of the active components is not significantly increased.

SUMMARY

The present invention is directed to a hydrorefining catalyst and a method for preparing the same, wherein the hydrorefining catalyst has a high dispersion degree of active components, high catalyst activity and selectivity, and high stability, and the preparation method is simple.

The present invention provides a method for preparing a catalyst by one-step impregnation by using a basic impregnation solution formulated by a mixed solvent.

A method for preparing a hydrorefining catalyst, wherein the catalyst includes active components supported on a support, the active components include cobalt and molybdenum. The method includes mixing an aqueous ammonia with a polyamine complexing agent to form a mixed solvent; adding a salt containing the active component cobalt to the mixed solvent and dissolving, and then adding a molybdenum salt or a molybdenum salt and a salt of other active components and promoters and dissolving, to prepare an impregnation solution; and impregnating a support with the impregnation solution, followed by aging, drying and activating the impregnated support to obtain a hydrorefining catalyst.

When the mixed solvent formulated by adding polyamine complexing agent to aqueous ammonia is used to dissolve the cobalt salt, cobalt is directly complexed with the mixed solvent to form a cobalt coordinated complex, without a need to be dissolved in aqueous ammonia and then form a complex with the complexing agent, thereby promoting dissolution of the active components of the catalyst.

In this method, in formulation of the impregnation solution, a nickel salt, a tungsten salt and/or a soluble alkali or carbonate compound of a Group IA element also may be optionally added. Generally, the pH value is preferably adjusted to be above 10. In this way, the formulated impregnation solution is clear and stable, and has a low surface tension and low viscosity.

The impregnation solution is formulated at 20° C. to 30° C. without heating. The present invention is particularly useful in preparation of the catalyst containing multiple high-content active components, especially containing high-content cobalt and molybdenum, and in particular, by a method for preparing the catalyst by using one-step isometric impregnation to load the active components onto the support, so that the active components are highly dispersed on the catalyst, B-acid centers on the catalyst are effectively removed and strong L-acid centers are weakened. The isometric impregnation described in the present invention means that the amount of the impregnation solution is 70% to 130% of the pore volume of the catalyst support.

In the present invention, polyamine complexing reagent may be one or more of EDTA, triethylenetetramine, triethanolamine and ethylenediamine, with ethylenediamine being preferred. The amount of polyamine complexing agent may vary with the amount of cobalt, which is not particularly limited in the present invention, and is preferably 5% to 10% (by volume) of the impregnation solution, because if the amount is too high, a large amount of organics may be decomposed in the process of calcination; and if the amount is too low, the effect of promoting dissolution of the active components and increasing the dispersion degree of the active components cannot be achieved. In formulation of the impregnation solution, the concentration of aqueous ammonia is not particularly limited in the present invention, provided that the active components can be completely dissolved according to the amount of the active components, so that the active components and polyamine as the complexing reagent are complexed to form stable complexes. Generally, after the active components are completely dissolved, a certain amount of aqueous ammonia may be added, so that the amount of the impregnation solution satisfies requirements for isometric impregnation. After the catalyst is treated by thermal activation, some ammonia molecules are still adsorbed on strong L-acid sites, so that the acidity of the catalyst is weakened, the hydrogenation selectivity and stability of the catalyst are improved, and especially the coking rate of catalyst in the reaction is decreased. The supports are impregnated by the method according to the present invention, aged and dried, to obtain the catalyst. No toxic gas is produced in the process of thermal activation of the catalyst, thus achieving one-step "green" preparation. Aging, drying and activation are all performed under the conditions in the prior art, which are not particularly limited in the present invention, and the activation temperature is preferably 350° C. to 600° C.

In the present invention, the solvent used for dissolving the active components is aqueous ammonia with polyamine complexing agent added. By using the mixed solvent, on the one hand, the solubility of the active components in aqueous ammonia is increased, and the amount of aqueous ammonia is reduced; on the other hand, the dispersion degree of the active components on the catalyst is significantly increased due to the addition of polyamine complexing agent.

The impregnation solution used in the present invention is a basic impregnation solution, which is formulated by, after the active components are dissolved, adjusting the pH value of the impregnation solution to be above 10, and preferably to be 10 to 12. The impregnation solution thus formulated is clear, stable, and has a low viscosity and good dispersion of active metals.

In the present invention, the active component molybdenum is added in the form of ammonium molybdate, and the active component cobalt is added in the form of cobalt sulfate, cobalt halide, cobalt nitrate or cobalt acetate, preferably cobalt nitrate or/and cobalt acetate, because cobalt nitrate and cobalt acetate have high solubility, which is beneficial to distribution of the active components on the support. As an alkali metal promoter, soluble alkalis of lithium, sodium, potassium, rubidium and cesium may be selected, soluble carbonates of lithium, sodium, potassium, rubidium and cesium may also be selected. In the present invention, potassium promoters are preferred, and hydroxides are preferred, because due to addition of a hydroxide, the basicity of the impregnation solution is enhanced, so that the metal active components are complexed with polyamine complexing agent, thereby increasing the stability of the impregnation solution. At the same time, due to the addition of the alkali metal promoters, the acidity of the catalyst is adjusted, and the anti-coking performance of the catalyst is enhanced.

In the present invention, the temperature conditions for preparation of the catalyst are not limited, preferably below 20° C. to 40° C., and the shaped alumina support is impregnated in the foregoing impregnation solution in one step, dried for 4 to 5 hours at 80° C. to 120° C., and calcinated for 3 to 8 hours at 350° C. to 600° C., to obtain the catalyst.

The support in the catalyst of the present invention is not specially limited, and a support for common supported hydrorefining catalysts, especially a support for cobalt or molybdenum supported hydrorefining catalysts, for example, a high-temperature resistant inorganic oxide such as alumina, silica, and alumina-silica, may be used. The support may be modified, with alumina supports being preferred.

In the method according to the present invention, the specific composition of the catalyst is not limited and the formulation of the catalyst may be adjusted as required. Science the impregnation solution is prepared by using the mixed solvent of the present invention, and the active components include cobalt and molybdenum, the resulting catalysts have excellent effects, as compared with those prepared by other methods.

BRIEF DESCRIPTION OF THE DRAWINGS

The accompanying drawings are comparison diagrams of the dispersion degrees of the active components of catalysts A and E in the detailed description. In the drawings.

DETAILED DESCRIPTION

Figure 1:
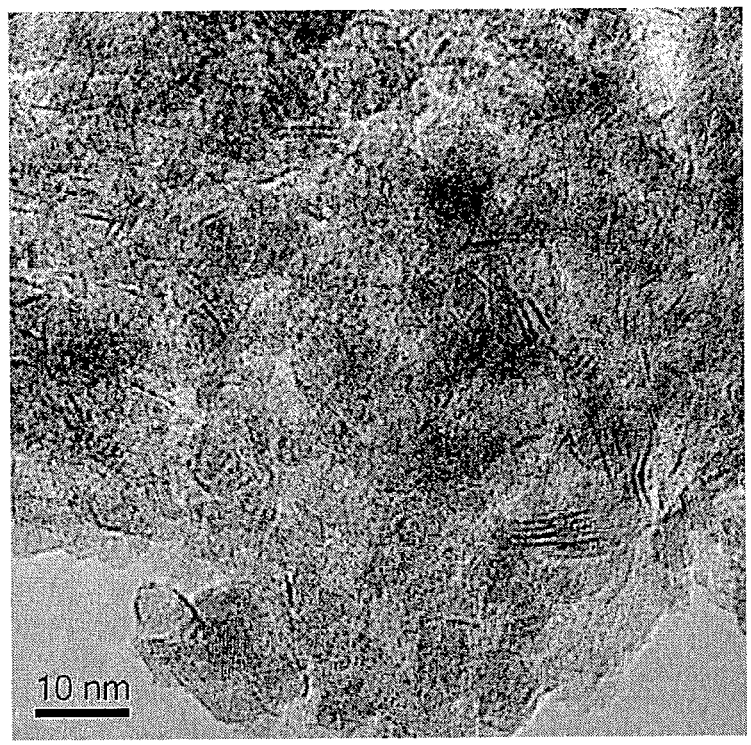
FIG. 1 is a transmission electron microscope image of the catalyst A according to the present invention.
Figure 2:
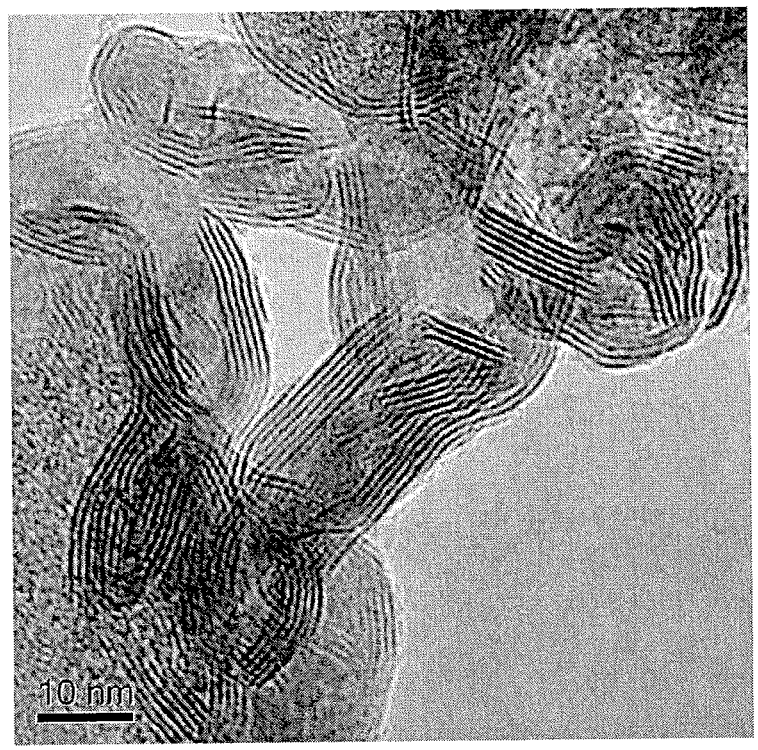
FIG. 2 is a transmission electron microscope image of the control catalyst E, in which black thread corresponds to a lamella of the active components, the length of the stripe is the length of the lamella, and the number of stacked stripes represents the number of lamellae.

To statistically analyze dispersion and stacking of MoS2 lamella on the support surface with TEM images of the catalyst, various regions on the catalyst surface are viewed and many electron microscope images were taken, and among which, FIG. 1 and FIG. 2 are the representative transmission electron microscope images. It can be seen from FIG. 1 and FIG. 2 that, the lamellae of the active components on the catalyst A have uniform length and are evenly distributed; and the lamellae of the active components on the catalyst B have different length, and are unevenly distributed.

The sources and main parameters in physical properties of main raw materials used for preparation of the catalyst are as follows:

$\gamma$-$Al_2O_3$: supplied by Zibo Wanlin Chemical Technologies Co. Ltd., with a pore volume of 0.90 to 0.95 ml/g and a specific surface area of 300 to 320 $m^2$/g;

Modified $\gamma$-$Al_2O_3$: supplied by Zibo Wanlin Chemical Technologies Co. Ltd., with a content of silica of 3.5%, a pore volume of 0.90 to 0.95 ml/g and a specific surface area of 300 to 320 $m^2$/g;

$\alpha$-$Al_2O_3$: supplied by Zibo Wanlin Chemical Technologies Co. Ltd., with a pore volume of 0.85 to 0.90 ml/g and a specific surface area of 280 to 300 $m^2$/g;

Aqueous ammonia: supplied by Baiying Liangyou Chemical Reagent Co. Ltd., with a concentration of 25 wt % to 30 wt %.

Analytical Methods and Criteria:

Determination method of content of metal in the catalyst: The contents of metals in the catalyst are determined by using atomic absorption spectroscopy;

Bromine number: SH/T 0630-1996 bromine number, bromine index determination method for petroleum products (coulometric method);

Diolefin: UOP326-07 maleic anhydride method;

Carbon deposit in catalyst (%): The carbon element in the catalyst is determined by using an elementary analyzer;

Nitrogen content: SH/T 0657, ASTM D4629 determination of trace nitrogen in liquid petroleum hydrocarbons;

Sulfur content: SH/T 0253-92 determination of total sulfur in light petroleum product (coulometric method);

Feedstock for hydrogenation: supplied by Lanzhou Petroleum & Chemical Company, with properties of petroleum products shown in Table 1.

TABLE 1

| | | Indicators of feedstock oils for hydrogenation | | | | | |
|---|---|---|---|---|---|---|---|
| Petroleum products | Color | Bromine number × $10^{-2}$ (g/g) | Diolefin × $10^{-2}$ (g/g) | Distillation range (° C.) | Density (g/ml) | Nitrogen content (μg/g) | Sulfur content (μg/g) |
| Pyrolysis gasoline | light yellow | 75 | 2.5 | 45-180 | 0.825 | / | 80-100 |
| Diesel oil | Brown | / | / | 60-190 | 0.940 | 250-300 | 800-1000 |

Example 1

At 30° C., to a mixed solution of 60 ml of aqueous ammonia and 5 ml of ethylenediamine, 14.21 g of cobalt acetate was added and dissolved under stirring, then 31.97 g of ammonium molybdate and 9.32 g of nickel nitrate were added and dissolved under stirring, followed by addition of 3.49 g of potassium hydroxide and addition of aqueous ammonia to adjust the volume of the solution to 80 ml. 100 g of a $\gamma$-$Al_2O_3$ support was impregnated with the solution, aged for 12 hours, dried for 4 hours at 120° C. and calcinated for 4 hours at 580° C., to obtain a catalyst A.

Example 2

At 25° C., to a mixed solution of 50 ml of aqueous ammonia and 7 ml of ethylenediamine, 28.01 g of cobalt acetate was added and dissolved under stirring, then 14.21 g of ammonium molybdate and 18.8 g of ammonium metatungstate were added and dissolved under stirring, followed by addition of 2.38 g of lithium hydroxide and addition of aqueous ammonia to adjust the volume of the solution to 100 ml. 100 g of an $\alpha$-$Al_2O_3$ support was impregnated in the solution, aged for 12 hours, dried for 5 hours at 100° C. and calcinated for 5 hours at 350° C., to obtain a catalyst B.

Example 3

At 20° C., to a mixed solution of 55 ml of aqueous ammonia and 5 ml of EDTA, 7.1 g of cobalt nitrate was added and dissolved under stirring, then 42.67 g of ammonium molybdate, 7.8 g of nickel acetate and 6.60 g of strontium nitrate were added for dissolution, followed by addition of 6.84 g of lithium carbonate and addition of aqueous ammonia to adjust the volume of the solution to 110 ml. 100 g of modified a $\gamma$-$Al_2O_3$ support was impregnated in the solution, aged for 12 hours, dried for 4 hours at 200° C., and calcinated for 3.5 hours at 400° C., to obtain a catalyst C.

Example 4

To 300 g of modified $\gamma$-$Al_2O_3$ powder, 8.4 ml of phosphoric acid and 140 ml of water were added, blended and extruded into a strip, dried in the air at 120° C. and calcinated for 6 hours at 560° C., to obtain a modified $\gamma$-$Al_2O_3$ support containing phosphorus.

At 25° C., to a mixed solution of 50 ml of aqueous ammonia and 9 ml of triethylenetetramine, 28.01 g of cobalt acetate was added and dissolved under stirring, then 14.21 g of ammonium molybdate and 18.8 g of ammonium metatungstate were added and dissolved under stirring, followed by addition of aqueous ammonia to adjust the volume of the solution to 95 ml. 100 g of modified $\gamma$-$Al_2O_3$ support containing phosphorus was impregnated in the solution, aged for 12 hours, dried for 5 hours at 100° C. and calcinated for 5 hours at 350° C., to obtain a catalyst D.

Comparative Example 1

At 30° C., to 60 ml of aqueous ammonia, 14.21 g of cobalt acetate was added and stirred until most of cobalt acetate was dissolved, then 5 ml of ethylenediamine was added and stirred until cobalt acetate was completely dissolved, then 31.97 g of ammonium molybdate and 9.32 g of nickel nitrate were added and dissolved under stirring, followed by addition of 3.49 g of potassium hydroxide and addition of aqueous ammonia to adjust the volume of the solution to 80 ml. 100 g or $\gamma$-$Al_2O_3$ support was impregnated in the solution, aged for 12 hours, dried for 4 hours at 120° C. and calcinated for 4 hours at 580° C., to obtain a catalyst E.

Comparison of dispersion degree of the active components between the catalysts A and E is shown in FIG. 1 and FIG. 2.

Comparative Example 2

At 25° C., to a mixed solution of 20 ml of ethylenediamine and 80 ml of water, 28.01 g of cobalt acetate was added and dissolved under stirring, then 14.21 g of ammonium molybdate and 18.8 g of ammonium metatungstate were added and dissolved under stirring, followed by addition of 2.38 g of lithium hydroxide, and 100 g of an $\alpha$-$Al_2O_3$ support was impregnated in the solution, aged for 12 hours, dried for 5 hours at 100° C. and calcinated for 5 hours at 350° C., to obtain a catalyst F.

Comparative Example 3

At 20° C., to 110 ml of aqueous ammonia, 7.1 g of cobalt nitrate was added and dissolved under stirring, and 100 g of a modified $\gamma$-$Al_2O_3$ support was impregnated in the solution, aged for 12 hours, dried for 4 hours at 200° C. and calcinated for 3.5 hours at 400° C. To 110 ml of aqueous ammonia, 42.67 g of ammonium molybdate, 7.8 g of nickel acetate and 6.60 g of strontium nitrate were added and dissolved under stirring, followed by addition of 6.84 g of lithium carbonate. 100 g of a modified $\gamma$-$Al_2O_3$ support was impregnated in the solution, aged for 12 hours, dried for 4 hours at 200° C., and calcinated for 3.5 hours at 400° C., to obtain a catalyst G.

The results of comparison in acidity between catalyst B and catalyst D are shown in Table 2.

TABLE 2

Results of comparison in acidity between catalyst B and catalyst D

| Catalyst | Weak acid (μmol/g) | | Strong acid (μmol/g) | |
|---|---|---|---|---|
| | L-acid | B-acid | L-acid | B-acid |
| Catalyst B | 230.29 | 6.52 | 62.55 | 0 |
| Catalyst D | 216.40 | 16.60 | 98.13 | 0 |

Example 5

200-hour evaluation of the catalysts A and E prepared as above was performed respectively on a 100 ml adiabatic bed hydrogenation unit, with the pyrolysis gasoline one-stage hydrogenation products as feedstock (properties of the feedstock as shown in Table 1). Samples were taken per 6 hours to analyze the iodine number and the sulfur content of the product. For mean data for 200-hour evaluation of the catalysts, see Table 4.

The conditions for catalyst presulphurization were as follows: adding carbon disulfide to cyclohexane to formulate a sulfurized oil (sulfur content: 1000 μg/g); charging hydrogen gas at a pressure of 2.8 MPa; when the temperature of a catalyst bed was raised to 240° C., feeding the sulfurized oil, continuously heating to 325° C. and maintaining at 325° C. for 30 hours, and then cooling to 240° C. to end the sulfurization.

The conditions for evaluation: reaction pressure of 2.6 MPa, inlet temperature of 240° C., volumetric space velocity of 3.0 h$^{-1}$ for fresh feedstock oils, and hydrogen to oil volume ratio of 300:1 based on fresh oils.

Example 6

1000-hour evaluation of the catalysts B, D and F was performed with the feedstock for evaluation, the conditions for catalyst presulphurization, the conditions for evaluation and the feedstock the same as those in Example 4. For average data of iodine number and sulfur content of the products for catalyst evaluation, see Table 5.

Example 7

1000-hour hydrogenation evaluation of the catalysts C and G prepared as above was performed respectively, on a 100 ml adiabatic bed hydrogenation unit, with the diesel oil as feedstock (properties of the feedstock as shown in Table 1). Samples were taken per 6 hours to analyze the nitrogen and the sulfur content of the product. For average data for 1000-hour evaluation of the catalysts, see Table 6.

INDUSTRIAL APPLICABILITY

The conditions for catalyst presulphurization were as follows: adding carbon disulfide to cyclohexane to formulate a sulfurized oil (sulfur content: 1000 μg/g); charging hydrogen gas at a pressure of 2.8 MPa; when the temperature of a catalyst bed was raised to 240° C., feeding the sulfurized oil, continuously heating to 325° C. and maintaining at 325° C. for 30 hours, then cooling to 240° C. to end the sulfurization.

The conditions for evaluation: reaction pressure of 2.8 MPa, inlet temperature of 280° C., volumetric space velocity of 3.0 $h^{-1}$ for fresh feedstock oils, and hydrogen to oil volume ratio of 300:1 based on fresh oils.

It can be seen from the evaluation results in Table 4 that, the catalyst preparation method according to the present invention can increase the dispersion degree of the active components of the catalysts, and enable the catalysts to have better activity and selectivity for hydrogenation.

It can be seen from the evaluation results in Table 5 that, the catalyst preparation method according to the present invention can reduce the catalyst acidity, and enable the catalysts to have excellent carbon deposit resistance and excellent stability for hydrogenation.

It can be seen from the evaluation results in Table 6 that, the catalysts prepared by the method for preparing the catalyst according to the present invention have high activities for hydrodesulfurization and denitrogenation.

When used in hydrodesulfurization, the catalyst prepared by the method according to the present invention can hydrogenate saturated mono-olefin to a maximum extent, and meet requirements of petroleum products with variable contents of sulfur and diolefin and requirements of high-space velocity operation. The catalyst has a high hydrogenation activity, a high selectivity, a long operation time and an excellent anti-coking performance.

TABLE 5

Average data for 1000-hour evaluation of catalysts B, D and F

| Catalyst No. | Example 2 B | Example 4 D | Comparative Example 2 F |
|---|---|---|---|
| Bromine number of hydrogenated products × $10^{-2}$ (g/g) | 0.83 | 1.0 | 2.4 |
| Sulfur content of hydrogenated products, μg/g | 0.90 | 1.0 | 2.7 |
| Carbon deposit on catalyst after 500-hour operation, % | 3% | 5% | 10% |
| Pressure drop in reactor after 500-hour operation of catalyst, MPa | Not obvious | Up to 0.10 | Up to 0.25 |

TABLE 6

Average data for 1000-hour evaluation of catalysts C and G

| Catalyst No. | Example 3 C | Comparative Example 3 G |
|---|---|---|
| Nitrogen content of hydrogenated products, μg/g | 55 | 157 |
| Sulfur content of hydrogenated products, μg/g | 227 | 430 |

What is claimed is:

1. A method for preparing hydrorefining catalyst, comprising supporting active components on a support, the active components comprising cobalt and molybdenum, wherein the method comprises the steps of:
    mixing an aqueous ammonia with a polyamine complexing agent to form a mixed solvent;
    adding a salt comprising the active component cobalt to the mixed solvent, dissolving the cobalt salt, and then adding and dissolving a molybdenum salt or a molybdenum

TABLE 3

Composition of catalysts A to E.

| Catalyst No. | Example 1 A | Example 2 B | Example 3 C | Example 4 D | Comparative Example 1 E | Comparative Example 2 F | Comparative Example 3 G |
|---|---|---|---|---|---|---|---|
| Molybdenum oxide, % | 18 | 8 | 24 | 8 | 18 | 8 | 24 |
| Cobalt oxide, % | 3.0 | 5.9 | 1.5 | 5.9 | 3.0 | 5.9 | 1.5 |
| Nickel oxide, % | 1.8 | / | 1.5 | / | 1.8 | / | 1.5 |
| Tungsten oxide, % | / | 10.0 | / | 10.0 | / | 10.0 | / |
| Potassium oxide, % | 2.2 | / | / | / | 2.2 | / | / |
| Lithium oxide, % | / | 1.5 | 1.5 | / | / | 1.5 | 1.5 |

TABLE 4

Average data for 1000-hour evaluation of catalysts A and E

| Catalyst No. | Example 1 A | Comparative Example 1 E |
|---|---|---|
| Bromine number of hydrogenated products × $10^{-2}$ (g/g) | 0.20 | 1.55 |
| Sulfur content of hydrogenated products, μg/g | 0.2 | 2.1 |
| Loss in benzene hydrogenation, % | 0.6 | 4.1 | salt and salts of other active components and promoters to prepare an impregnation solution; and
    impregnating a support with the impregnating solution, followed by aging, drying and activating the impregnated support to obtain the hydrorefining catalyst.

2. The method for preparing hydrorefining catalyst according to claim 1, wherein a nickel salt, a tungsten salt and/or a soluble alkali or carbonate compound of a Group IA element is added during formulation of the impregnation solution.

3. The method for preparing hydrorefining catalyst according to claim 1, wherein the impregnation solution has a pH value of above 10.

4. The method for preparing hydro refining catalyst according to claim 1, wherein the polyamine complexing agent is one or more of EDTA, triethylene tetraamine, triethanolamine and ethylenediamine.

5. The method for preparing hydrorefining catalyst according to claim 1, wherein the polyamine complexing agent is added at an amount of 5% to 10% by volume of the impregnation solution.

6. The method for preparing hydrorefining catalyst according to claim 1, wherein the cobalt salt is selected from the group consisting of cobalt sulfate, cobalt halide, cobalt nitrate and cobalt acetate.

7. The method for preparing hydrorefining catalyst according to claim 6, wherein the cobalt salt is cobalt nitrate or cobalt acetate.

8. The method for preparing hydrorefining catalyst according to claim 1, wherein the support is alumina, silica, alumina-silica.

* * * * *